United States Patent [19]

Sniderman

[11] 4,111,052

[45] Sep. 5, 1978

[54] PRESSURE-SENSITIVE WRITING STYLUS

[75] Inventor: Albert Sniderman, W. Bloomfield, Mich.

[73] Assignee: Burroughs Corporation, Detroit, Mich.

[21] Appl. No.: 828,314

[22] Filed: Aug. 29, 1977

[51] Int. Cl.² .................................................. G01D 9/02
[52] U.S. Cl. .................................... 73/432 R; 401/194
[58] Field of Search .......................... 73/432 R, 141 A; 340/146.3 SY, 149 R; 235/431; 178/18; 401/194

[56] References Cited

U.S. PATENT DOCUMENTS

| 3,528,295 | 9/1970 | Johnson et al. | 73/432 R |
| 3,618,019 | 11/1971 | Nemirovsky et al. | 340/146.3 R |
| 3,986,403 | 10/1976 | Hurd et al. | 73/432 R |

Primary Examiner—Jerry W. Myracle
Attorney, Agent, or Firm—Robert C. J. Tuttle; Carl Fissell, Jr.; Kevin R. Peterson

[57] ABSTRACT

A pressure-sensitive pen for use in a signature verification system is responsive to the handwriting pressure applied by the pen user to develop a signal representative of the pressure. In the preferred form, the pen comprises a cylindrical barrel that houses a ball-point pen cartridge encased within a rigid tubular member. The tubular member is secured by a flange to the lower end of the barrel, and is closed at its upper end. The pressure of the cartridge writing tip on the writing surface causes the upper end of the cartridge to bear against the closed end of the tubular member and cause strain therein. The strain in the tubular member is sensed and translated into a signal representative of the user's handwriting pressure.

10 Claims, 6 Drawing Figures

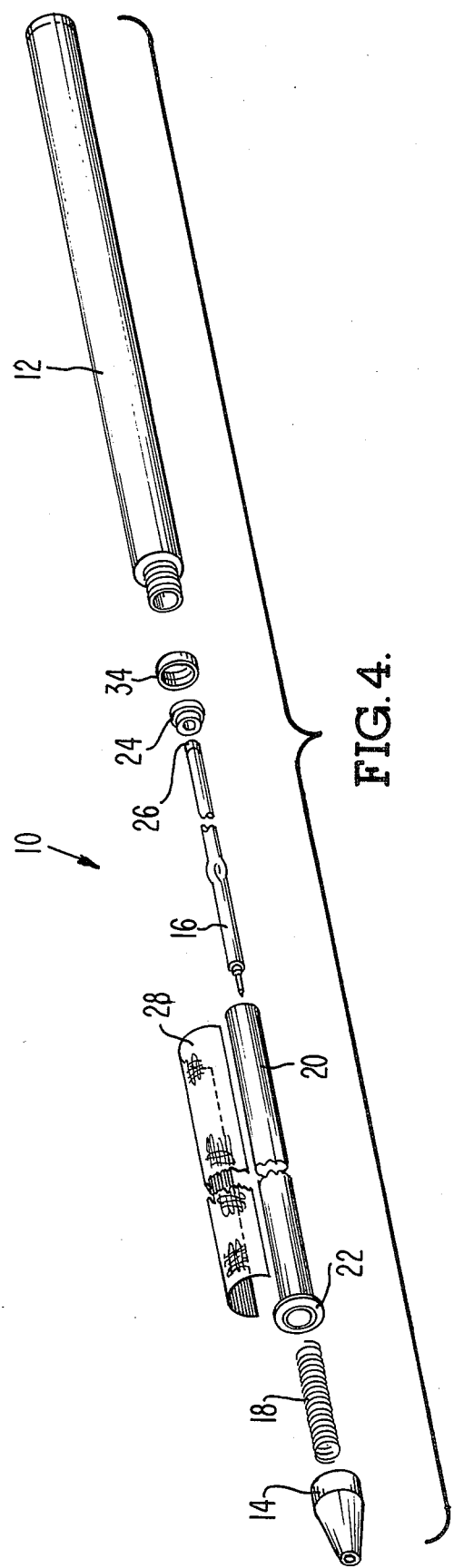
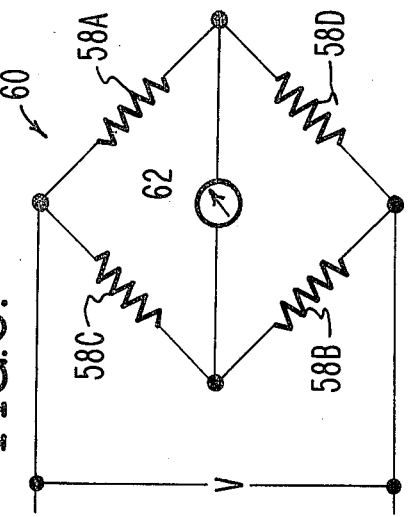
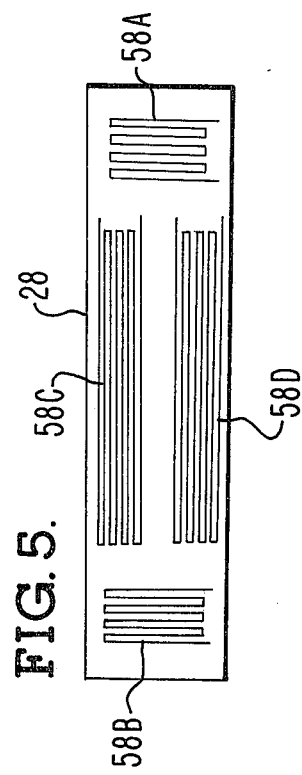
FIG. 4.
FIG. 5.
FIG. 6.

PRESSURE-SENSITIVE WRITING STYLUS

BACKGROUND OF THE INVENTION

1. Field of the Invention

The present invention relates to signature verification devices, and more particularly, to a writing stylus that is sensitive to writing pressure.

2. Description of the Prior Art

Personal identification systems are needed in situations where one must authenticate his identity as a precondition to taking certain actions or receiving certain privileges. Practical examples of the need for personal identification include limiting access to classified information or militarily secure areas, honoring bank checks or other forms of commercial paper, and extending credit in a credit card transaction. In each of these instances, the importance of making an accurate determination of an individual's identity is proportioned to the security and financial risk of misidentifying him or her.

The prior art contains various devices that adjudge an individual's identity on the basis of a unique identifying characteristic associated with the individual. These identifying characteristics include finger prints, lip prints, voice graphs, and handwritten signatures. Personal identification devices using these characteristics have various degrees of reliability and practicability.

Verifying an individual's identity through the comparison of his or her handwritten signature sample against a reference signature is one of the most practicable and reliable methods. Various indicia or characteristics associated with the individual's signature or act of signing can be measured to discriminate between genuine and forged signatures. Included among those indicia or characteristics are pen velocity, pen direction, and pen pressure.

Focusing on the use of pen pressure, the pressure may be sensed either in the writing instrument or on the writing surface. The difficulty of the latter approach, i.e. using the writing surface, is in the inflexibility of requiring that the signature occur at the fixed situs of the surface. Moreover, it would be expensive to provide pressure sensitive surfaces in all the instances where they are needed, e.g., every teller's window in a bank using signature verification would have to be provided with a pressure sensitive platen.

For broad applicability, the preferred approach is to use the pen or other type of writing stylus as the pressure sensing member. However, for the pen to be practicable it must meet several important design considerations, including high sensitivity to loading pressure, ruggedness in reliability for use in a commercial or retail environment, refillability to allow the ink supply to be replenished, and ease of manufacture to make the cost competitive with other forms of personal identification device.

These foregoing considerations define the primary objectives of the present invention.

BRIEF SUMMARY OF THE INVENTION

The subject invention is a pressure sensitive writing stylus for use in conjunction with a signature verification device. The stylus, preferably in the form of a pen, is responsive to the pressure which the hand writer uses to execute his or her signature to provide a signal representative of such pressure.

The preferred form of the invention takes the form of a ball-point pen assembly. The assembly includes an outer barrel which is divided into two axial segments. Disposed within the barrel is a conventional ball-point pen cartridge encased in a tubular member. The tubular member is secured to the barrel at the juncture of the two axial segments, and is closed at its upper end distal the writing tip of the cartridge. In operation, the loading pressure caused by the contact of the ball-point tip against the writing surface causes the upper end of the cartridge to bear against the closed end of the tubular member. This relationship creates a longitudinal strain in the tubular member which may be sensed by transducers, preferably strain gages, and translated into a signal representative of the loading pressure. In the preferred embodiment, the strain gages are arranged in a bridge network and the signal is taken across the bridge output terminals.

Other advantages of the present invention will be readily appreciated as the same becomes better understood by reference to the following detailed description when considered in connection with the accompanying drawings.

BRIEF DESCRIPTION OF THE DRAWINGS

FIG. 4 is an exploded isometric view of the pressure sensitive pen of FIG. 1;

FIG. 5 is a developed view of the strain gage transducers of FIG. 4; and

FIG. 6 is a schematic diagram of a bridge network representing the electrical interconnection of the strain gages.

DETAILED DESCRIPTION OF A SPECIFIC EMBODIMENT

Figure 1:
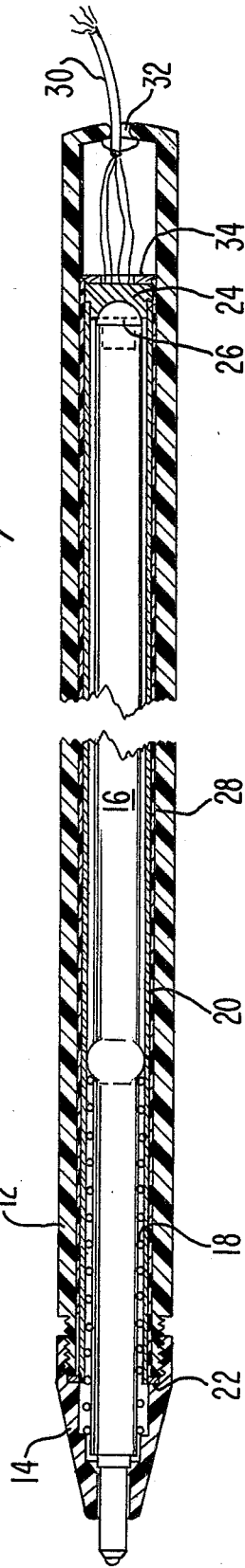
FIG. 1 is a cross sectional view of a pressure sensitive pen incorporating the present invention.

A pressure sensing stylus or pen incorporating the present invention is shown generally at 10 in FIG. 1. Broadly, the pen 10 is responsive to a loading force applied along the longitudinal axis of the pen by the writer to produce a signal representative of the loading force. The description of the pen 10 will begin with a broad overview of the components forming the pen assembly, and advance to a more detail discussion of each component and its function within the assembly.

The pen 10 comprises an outer barrel assembly defined by an upper barrel segment 12 and a lower barrel segment 14. The barrel segment 12 preferably extends over the major length of the axial dimension of the pen, and joins in threaded engagement with a lower barrel segment 14, which is much shorter in relative length than the upper segment. The lower barrel segment is preferably formed of molded Nylon or other low-friction material to reduce lateral frictional effects with other constituent parts.

A ball-point pen cartridge 16 is disposed within the barrel in aligned relation with respect to the longitudinal axis thereof. The cartridge 16 is a common ball-point pen refill of preferably a rigid-wall construction. The cartridge is loaded in position against a conventional ball-point pen spring 18.

A tubular casing member 20 is similarly disposed within the barrel in aligned relation with the longitudinal axis thereof. The tubular casing member 20 has an essentially hollow, cylindrical shape and is preferably formed of thin stainless steel. It terminates at its bottom end in an integral, annular flange 22. The upper end is closed by a cap 24, which in the disclosed embodiment, is fastened to the casing member 20. A plug 26, formed in mating relation with the cap 24, is press fit in the upper end of the cartridge 16. A bushing 34 positions the cartridge-casing member assembly in concentric relation with the pen barrel. The fabrication of a tubular casing member 20 meeting this description is within the state of the art, and may be commercially obtainable from Uniform Tubes, Inc., Kleiner Metal Specialties, Collegeville, PA 19426, USA. The design and cooperation of the cap 24 and plug 26 will be hereinafter described in greater detail.

The casing member 20 has bonded to its circumferential surface a thin transducer carrier sheet 28. In the preferred embodiment, the sheet 28 has a Mylar substrate and thin foil surface, having etched within it a pattern of strain gages. The strain that results from longitudinal loading forces along the axial dimension of the pen is to be sensed by the strain gages carried by the sheet 28. The signals from the transducers are output on leads 30 through an aperture 32 in the top end of the upper barrel segment 12.

The pen 10, which was shown in assembled relation in FIG. 1, is shown exploded along its axial dimension in FIG. 4 for a clearer exposition of its constituent parts.

The upper segment 12 of the barrel first receives within it the bushing 34 that maintains the tubular casing member 20 in concentric spaced relation. The bushing 34 receives the cap 24, which in turn receives the plug 26 inserted into the open end of the cartridge 16. The casing member 20 surrounds the cartridge 16 and spring 18. The transducer carrier sheet 28 is wrapped about and bonded to the circumferential surface of the casing member 20, preferably by cementing. The annular flange 22 of the casing member 20 is received within the lower barrel segment 14.

Figure 2:
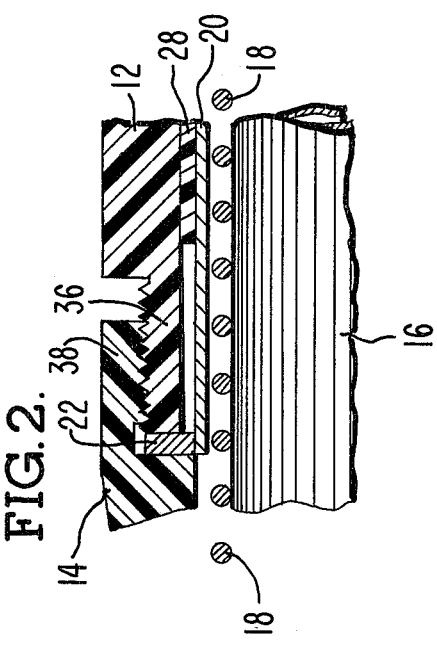
FIG. 2 is an enlarged, cutaway view taken from FIG. 1 illustrating the positioning of the flange on the inner tubular casing within the threaded engagement of the barrel segments.

Referring now to FIG. 2, the manner in which the tubular casing member 20 is secured to the barrel segments 12 and 14 is shown in greater detail. More specifically, barrel segment 12 terminates at its lower end in a male threaded portion 36. Barrel segment 14 terminates at its upper end in a female threaded portion 38. The flange 22 is seated on the lower barrel segment 14 and borne against by the threaded and portion 36 of upper segment 12. In short, the threaded engagement of barrel segments 12 and 14 secures the tubular casing member in position by pressing or bearing against the annular flange 22.

Figure 3:
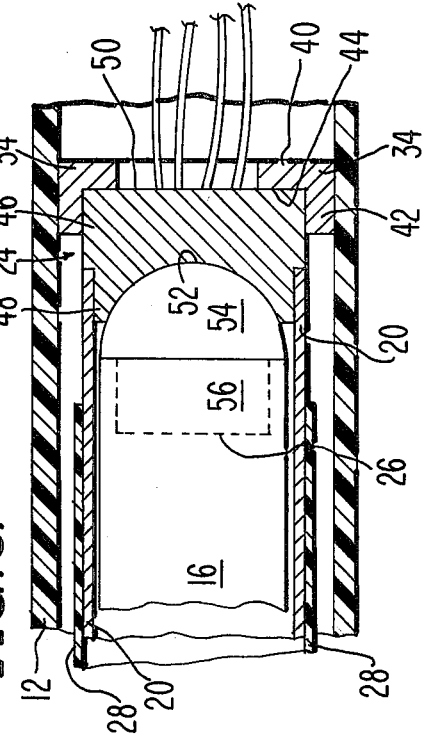
FIG. 3 is an enlarged, cutaway view taken from FIG. 1 of the seating arrangement between the closed ends of the pen cartridge and tubular casing.

Referring now to FIG. 3, the positioning and cooperation of the cap 24 and plug 26 will next be discussed.

The cap 24 is press fit into the open end of the casing member 20. The cap has an upper cylindrical segment 46 and a lower cylindrical segment 48, the lower segment having a reduced diameter with respect to the upper segment. The bottom face of the cap 24 has a concave hemispherical shape. In an alternative embodiment, the tubular casing member 20 could be formed with an integral, hemispherical closure for the same purpose for which the cap is provided.

The cap 24 is mounted in concentric relation to the barrel axis by a bushing 34. The bushing is preferably formed of Nylon and has an upper cylindrical segment 40, and a lower cylindrical segment 42 of reduced diameter with respect to the upper segment. The lower face 44 of the upper segment 40 of the bushing defines a seat for the top surface 50 of the end cap.

The plug 26 is similarly press fit into the open end of the cartridge 16. In the preferred embodiment, the plug comprises a hemispherical head 54 integrally formed with a retaining stud 56. The hemispherical head 54 is mateable with the concave hemispherical surface 52 of the end cap 24. As hemispherical head 54 bears against the mating surface 52 it tends to transmit only force components along the longitudinal axis of the pen.

The force transmitted by hemispherical head 52 is a reactive force caused by the contact of the cartridge tip against the writing surface. This force or pressure is the variable that is to be sensed for the purposes of defining a handwriting pattern. The impartation of force from the hemispherical head 54 to the end cap 52 causes a resultant strain in a longitudinal dimension of the tubular casing member 20. This strain is sensed by a plurality of strain gage transducers mounted on the carrier sheet 28.

Referring now to FIG. 5, the carrier sheet 28 is shown in developed relation with an array of strain gages 58A, B, C and D arranged thereon. More specifically, strain gages 58A and B are sensitive to strain in a direction transverse to the longitudinal axis of the casing member 20. In this application strain gages 58A and B are passive and are intended to provide temperature compensation for a bridge circuit as will hereinafter be made apparent. Strain gages 58C and D are sensitive to strain in the casing member 20 along its longitudinal dimension. In this application strain gages 58C and D are active gages, and their changes in resistance value will be reflected as an output signal indicative of the amount of strain in the casing member.

FIG. 6 is a schematic representation of a bridge circuit that illustrates the electrical interconnection of strain gages 58A, B, C and D. Gages 58C and D are in diagonally opposing arms so as to provide an additive output signal. Gages 58A and B are placed in the other two diagonally opposing arms. The presence of passive gages 58A and B tends to temperature compensate active gages 58C and D. A voltage V is applied across the terminals defined by the juncture of gages 58A and C and 58B and D. When strain gages 58C and D are subjected to longitudinal strain, the bridge will go out of balance, and a signal will appear at the terminals defined by the juncture of gages 58C and B and 58A and D. A metering device 62 interprets the voltage variation between the last mentioned pair of terminals as an output signal.

The advantages of the present invention include the capability of being able to use a standard ball-point pen cartridge or refill. In addition, the novel closure arrangement of the cartridge and casing member assures that only longitudinal load force or pressure will be sensed.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed:

1. A pressure-sensitive stylus for use in a personal identification system of the type wherein handwriting pressure is used as the identification discriminant, the stylus comprising:

a stylus housing defined by a hollow elongate body having a longitudinal axis;

a stylus cartridge mounted within the stylus housing in aligned relation with the longitudinal axis thereof, the stylus cartridge having a writing tip at one end for contacting a record surface, and a bearing surface at the other end for transmitting the reactive force caused by contact of the writing tip with the record surface;

a hollow casing member disposed within the stylus housing in aligned relation with the longitudinal axis thereof, and being shaped and dimensioned to receive the stylus cartridge, the casing member being secured to the stylus housing at a position proximate the cartridge writing tip, and being closed at the other end to receive the reactive force transmitted by the bearing surface; and transducer means, associated with the hollow casing member and responsive to the force transmitted by the stylus cartridge thereto, for providing a signal representative of the transmitted force as an indication of the handwriting pressure.

2. The invention as defined in claim 1, wherein the bearing surface of the stylus cartridge and the closed end of the casing member are formed to mate with one another as complementary spherical surfaces.

3. The invention as defined in claim 1, wherein the hollow casing member comprises a cylindrical tube having a flange at one end for securement to the stylus housing, and having a closure at the other end to receive the bearing surface.

4. The invention as defined in claim 3, wherein the stylus housing comprises a barrel assembly formed of first and second engageable axial segments, the engagement of the axial segments further securing the casing member flange at their juncture.

5. The invention as defined in claim 4, wherein the first and second segments are threadingly engageable, and the flange comprises an outer, annular ring, the flange being secured within the threaded engagement of the first and second axial segments.

6. The invention as defined in claim 4, wherein the axial segment proximate the writing tip is formed of a relatively low friction material to minimize lateral frictional effects between the stylus cartridge and such axial segment in the area of the writing tip.

7. The invention as defined in claim 6, wherein the axial segment proximate the writing tip is formed of mylon.

8. The invention as defined in claim 1, wherein the transducer means comprises strain detecting means responsive to mechanical strain along the longitudinal axis of the hollow casing member.

9. The invention as defined in claim 8, wherein the strain detecting means includes at least one strain gage mounted on the hollow casing member.

10. The invention as defined in claim 1, wherein the stylus cartridge comprises a ball-point pen cartridge, and the bearing surface is defined by a plug insertable into the end opposite the writing tip of the cartridge, the plug having a hemispherical head integrally formed with a retaining stud; and wherein the hollow casing member comprises a tubular body having a spherical closure at the end receiving the bearing surface, and a flange at the end proximate the writing tip.

* * * * *